UNITED STATES PATENT OFFICE.

GEORGE BURT, OF PAINESVILLE, OHIO.

IMPROVEMENT IN MEDICAL COMPOUNDS OR LIP-SALVES FOR CORNET-PLAYERS AND OTHERS.

Specification forming part of Letters Patent No. 131,935, dated October 8, 1872.

*To all whom it may concern:*

Be it known that I, GEORGE BURT, of Painesville, in the county of Lake and State of Ohio, have invented a compound called an Embouchure Restorative, for hardening the lips of cornet and other brass-instrument players; also as a cure if the lips are sore or inflamed. It will also cure cold-sores and scald lip, and is also a good application after shaving, to prevent the face from being sore on exposure to the cold.

To prepare the compound take one gallon rectified spirits of wine; one pint strongest tincture of arnica; six ounces castor-oil; four ounces glycerine; four and a half ounces tannic acid; one and a half ounce gum-camphor; one and a half pints wizard-oil; thirty drops carbolic acid; thirty drops oil of bergamot.

The above-mentioned parts are added together and allowed to stand in a warm situation for a few days, when the compound will clear and become perfectly limpid.

What I claim as my invention, and desire to secure by Letters Patent, is—

The above-mentioned compound, denominated an embouchure restorative, of the ingredients, in the proportions, and for the purposes set forth.

GEORGE BURT.

Witnesses:
WILLIAM PETTINGELL,
JOHN W. TYLER.